United States Patent [19]
Parker et al.

[11] Patent Number: 5,992,307
[45] Date of Patent: Nov. 30, 1999

[54] PORTABLE OUTDOOR STEAMER SYSTEM

[76] Inventors: Robert A. Parker; Eric Parker, both of 361 Laurelwood Dr., Wilton, N.H. 03086

[21] Appl. No.: 09/160,168

[22] Filed: Sep. 25, 1998

[51] Int. Cl.$^6$ .............................. A47J 27/04; A47J 27/12; A47J 37/00; A47J 37/06
[52] U.S. Cl. ................................ 99/417; 99/448; 99/450; 99/473; 99/483; 126/20; 126/25 R; 126/369
[58] Field of Search .............................. 99/339, 340, 393, 99/403, 407–409, 410–418, 423, 447–450, 446, 467, 473, 483; 126/25 R, 20, 9 R, 9 B, 38, 369, 377, 39 R, 41 R, 293, 350 R, 37 R; 219/401; 426/523

[56] References Cited

U.S. PATENT DOCUMENTS

| | | | |
|---|---|---|---|
| 3,967,613 | 7/1976 | Rybak et al. | 126/41 R |
| 4,616,625 | 10/1986 | Froome | 99/410 X |
| 4,773,319 | 9/1988 | Holland | 99/446 |
| 4,913,039 | 4/1990 | Sutphen | 99/339 |
| 5,121,676 | 6/1992 | Jurgens | 99/340 |
| 5,553,531 | 9/1996 | Brown | 99/340 |
| 5,611,264 | 3/1997 | Studer | 99/340 |

*Primary Examiner*—Timothy F. Simone

[57] ABSTRACT

A portable outdoor steamer system comprising a hollow container with an open top and a closed generally inverted dome-shaped bottom with a cover in a dome-shaped configuration. The steamer also contains a hollow support with a circular upper end secured to the lower surface of the bottom of the container. Also provided are heating components including a burner secured in the upper extent of the support on a circular plate, a hook-up mounted externally on the base and operatively coupled to the burner and a heat control dial mounted externally of the housing on a control panel operatively coupled to the burner with air holes through the base above the plate and a door formed in the housing to provide access to the burner. Air ports extend through the container in a central extent thereof with at least one food supporting rack removably secured within the container on short radial fingers above the ports, the region of the container beneath the ports for retaining water to be heated and converted into steam for cooking food supported thereabove on the racks.

6 Claims, 2 Drawing Sheets

PORTABLE OUTDOOR STEAMER SYSTEM

BACKGROUND OF THE INVENTION

1. Field of the Invention

The present invention relates to a portable outdoor steamer system and more particularly pertains to steaming food with a portable outdoor system.

2. Description of the Prior Art

The use of devices to cook food of known designs and configurations is known in the prior art. More specifically, devices to cook food of known designs and configurations heretofore devised and utilized for the purpose of steaming food through various methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,320,246 to Issod discloses a Truncated Kettle Adapted for Use as a Steamer. U.S. Pat. No. 5,553,531 to Brown discloses a Cooking Device. U.S. Pat. No. Des. 325,318 to Parent et al. discloses a Combined Kettle and Side Tables for a Barbecue Grill. U.S. Pat. No. 5,611,264 to Studer discloses a Dutch Oven Type Cooking Vessel With Combination Cooking Surface. U.S. Pat. No. 4,660,542 to Scherer discloses a Cooking System With Closed Loop Heat Transfer Means. Lastly, U.S. Pat. No. Des. 381,553 to Candianides discloses a Food Steamer.

In this respect, the portable outdoor steamer system according to the present invention substantially departs from the conventional concepts and designs of the prior art, and in doing so provides an apparatus primarily developed for the purpose of steaming food with a portable outdoor system.

Therefore, it can be appreciated that there exists a continuing need for a new and improved portable outdoor steamer system which can be used for steaming food with a portable outdoor system. In this regard, the present invention substantially fulfills this need.

SUMMARY OF THE INVENTION

In view of the foregoing disadvantages inherent in the known types of devices to cook food of known designs and configurations now present in the prior art, the present invention provides an improved portable outdoor steamer system. As such, the general purpose of the present invention, which will be described subsequently in greater detail, is to provide a new and improved portable outdoor steamer system and method which has all the advantages of the prior art and none of the disadvantages.

To attain this, the present invention essentially comprises a new and improved portable outdoor steamer system for steaming food with a portable outdoor system comprising a hollow cylindrical container with an open top and a closed generally inverted dome-shaped bottom with a cover in a dome-shaped configuration and with a hinge pivotally securing the cover to the top of the container and a handle extending from the upper center of the cover to radially exterior of the cover. Also provided is a hollow cylindrical support which has a circular base at its lower end and with a circular upper end secured to the lower surface of the bottom of the container. Heating components include a propane burner secured in the upper extent of the support on a circular plate. A propane hook-up is mounted externally on the base and operatively coupled to the burner and an ignition button and a heat control dial are mounted externally of the housing on a control panel operatively coupled to the burner with air holes through the base above the plate. A door is formed in the housing to provide access to the burner. Air ports extend through the container in a central extent thereof with three perforated food supporting racks removably secured within the container on short radial fingers above the ports. A water tap is in the lower extent of the container for the removal of water therefrom, the region of the container beneath the ports for retaining water to be heated and converted into steam for cooking food supported thereabove on the racks.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved portable outdoor steamer system which has all of the advantages of the prior art devices to cook food of known designs and configurations and none of the disadvantages.

It is another object of the present invention to provide a new and improved portable outdoor steamer system which may be easily and efficiently manufactured and marketed.

It is further object of the present invention to provide a new and improved portable outdoor steamer system which is of durable and reliable constructions.

An even further object of the present invention is to provide a new and improved portable outdoor steamer system which is susceptible of a low cost of manufacture with regard to both materials and labor, and which accordingly is then susceptible of low prices of sale to the consuming public, thereby making such portable outdoor steamer system economically available to the buying public.

Even still another object of the present invention is to provide a portable outdoor steamer system for steaming food with a portable outdoor system.

Lastly, it is an object of the present invention to provide a new and improved portable outdoor steamer system comprising a hollow container with an open top and a closed generally inverted dome-shaped bottom with a cover in a dome-shaped configuration. The steamer also contains a hollow support with a circular upper end secured to the lower surface of the bottom of the container. Also provided are heating components including a burner secured in the upper extent of the support on a circular plate, a hook-up mounted externally on the base and operatively coupled to the burner and a heat control dial mounted externally of the housing on a control panel operatively coupled to the burner with air holes through the base above the plate and a door formed in the housing to provide access to the burner. Air ports extend through the container in a central extent thereof with at least one food supporting rack removably secured within the container on short radial fingers above the ports, the region of the container beneath the ports for retaining water to be heated and converted into steam for cooking food supported thereabove on the racks.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
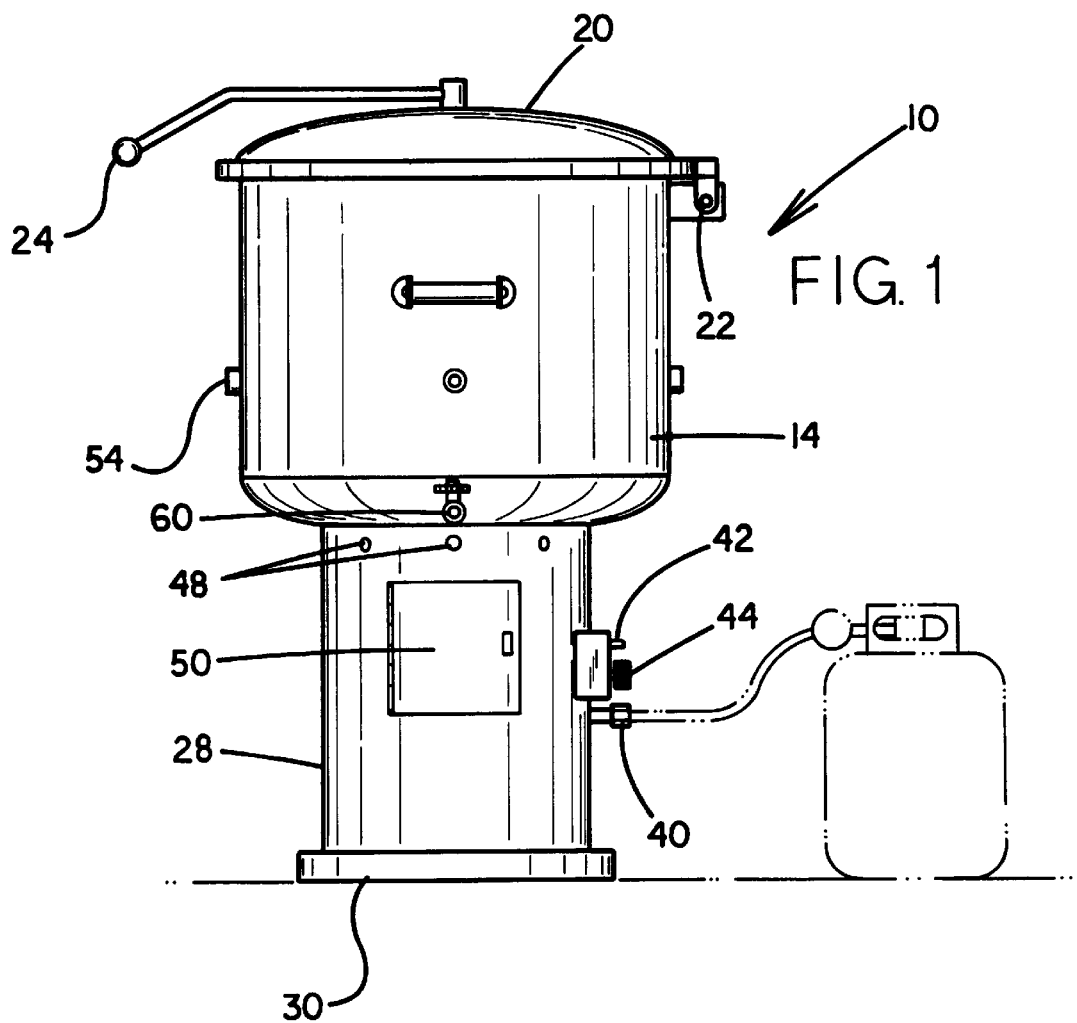
FIG. 1 is a front elevational view of the preferred embodiment of the portable outdoor steamer system constructed in accordance with the principles of the present invention.
Figure 2:
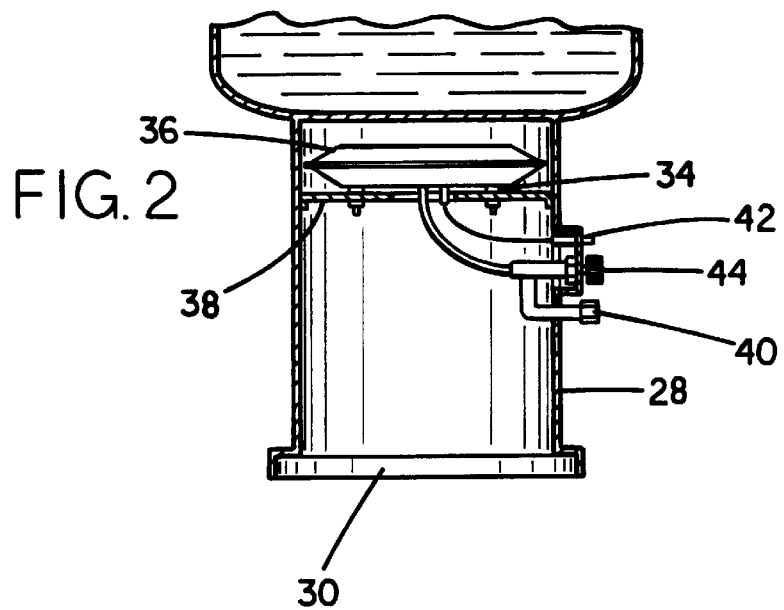
FIG. 2 is a cross-sectional view of the lower portion of the system shown in FIG. 1.

With reference now to the drawings, and in particular to FIG. 1 thereof, the preferred embodiment of the new and improved portable outdoor steamer system embodying the principles and concepts of the present invention and generally designated by the reference numeral 10 will be described.

The present invention, the portable outdoor steamer system 10 is comprised of a plurality of components. Such components are individually configured and correlated with respect to each other so as to attain the desired objective.

Figure 3:
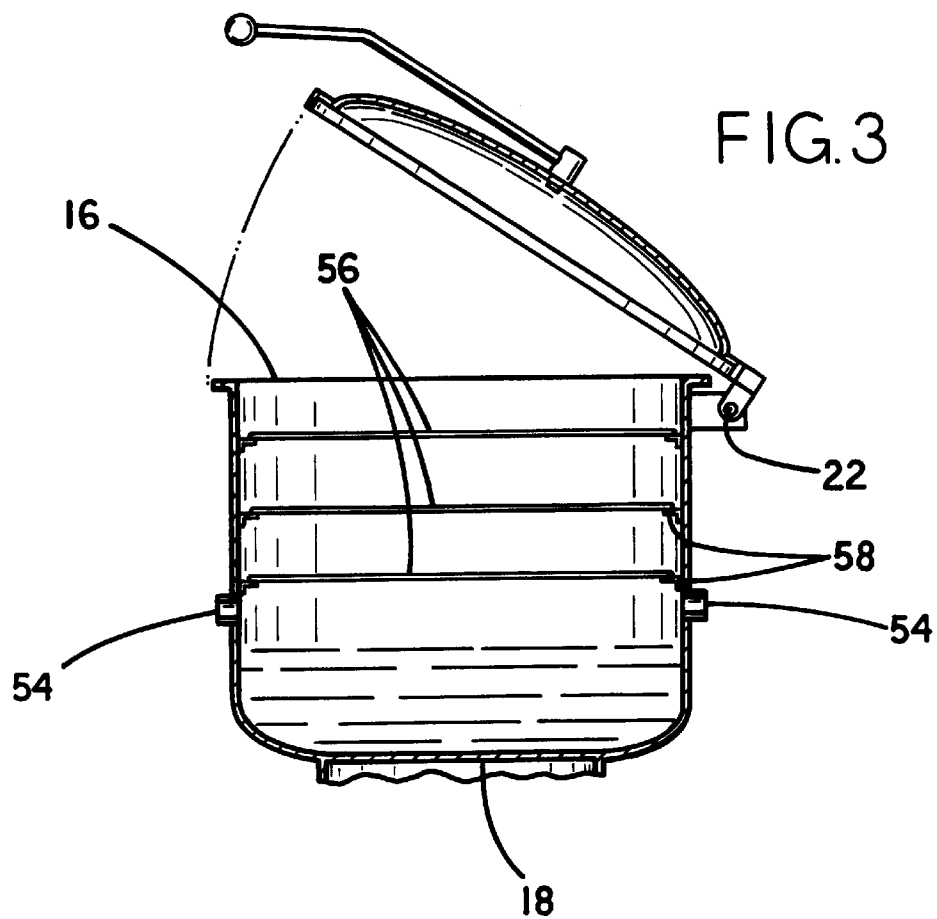
FIG. 3 is a cross-sectional view of the upper portion of the system shown in FIG. 1 with the cover partially lifted.
Figure 4:
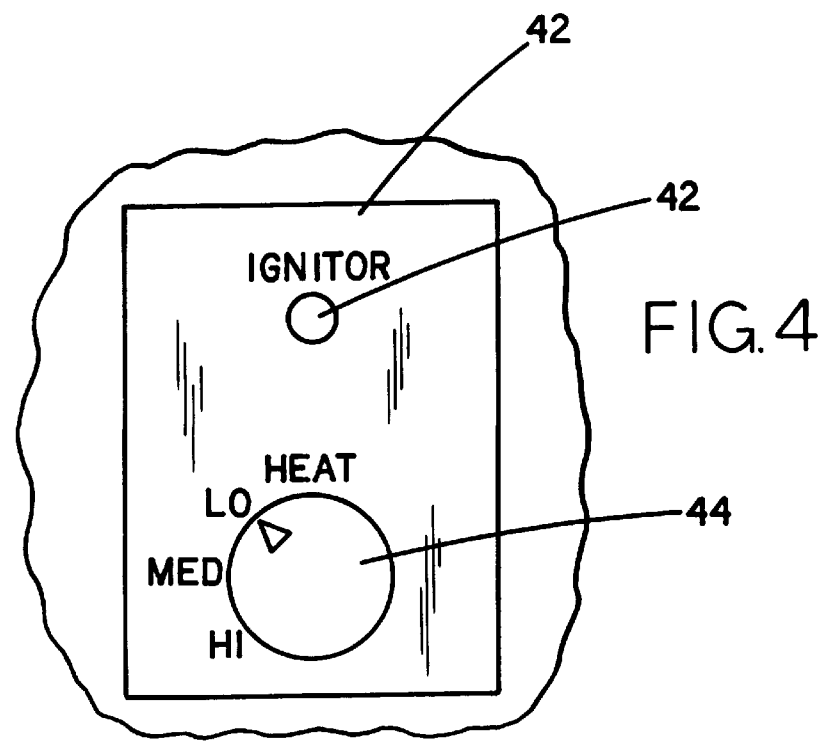
FIG. 4 is a front elevational view of the control panel shown in FIGS. 1 and 2.

More specifically, the new and improved portable outdoor steamer system for steaming food with a portable outdoor system comprises, in combination a hollow cylindrical container 14 with an open top 16 and a closed generally inverted dome-shaped bottom 18. The container is preferably equipped with a pair of diametrically opposed handles mounted on a central extent thereof. Also included is a cover 20 in a dome-shaped configuration with a hinge 22 pivotally securing the cover to the top of the container. A handle 24 extends from the upper center of the cover to radially exterior of the cover. As shown in FIGS. 1 & 3, the handle has a horizontally oriented inboard extent and a downwardly angled outboard extent with a length twice that of the inboard extent. A ball is mounted on an end of the outboard extent of the handle.

A hollow cylindrical support 28 is provided which has a circular base 30 at its lower end and a circular upper end secured to the lower surface of the bottom of the container. A height of the support is preferably equal to that of the container. As an option, the base may be equipped with wheels for transportation purposes.

Heating components 34 include a propane burner 36 secured in the upper extent of the support on a circular plate 38 beneath the bottom of the container. A propane hook-up 40 is mounted externally on the base and operatively coupled to the burner. Further, an ignition button 42 and a heat control dial 44 are mounted externally of the housing on a control panel 46. The ignition button 42 and heat control dial 44 are operatively coupled to the burner for controlling the operation of the burner.

Air holes 48 are formed through the base above the plate and beneath the container. A door 50 is formed in the housing to provide access to the burner. Air ports 54 extend through the container in a central extent thereof. The air ports and air holes are preferably spaced apart by 90 degrees. Three circular perforated food supporting racks 56 removably rested within the container on short radial fingers 58 above or below the ports. When used, the food supporting racks are equally spaced. As an option, the racks may be equipped with diametrically opposed handles for facilitating removal.

A water tap 60 with an associated spigot is mounted on the lower extent of the container above the bottom thereof for the removal of water therefrom. The region of the container beneath the ports is for retaining water to be heated and converted into steam for cooking food supported thereabove on the racks.

As described hereinabove, the portable outdoor steamer system is a new type of outdoor cooking appliance that can be used to steam vegetables, shellfish and other foods. It consists of a 24 inch diameter by approximately 15 to 20 inch deep vessel with a hinged, latchable lid. Inside the steamer is a series of removable racks, as well as a lower portion that can be used to hold a volume of water. The steamer has side walls that feature a series of vent ports and a pair of carrying handles. The unit is mounted atop a cylindrical housing with a large flange on its lower end that acts as a base. Overall, the unit measures 38 inches high. One side of the cylindrical section features a window that provide access to a propane gas hookup and a burner similar to that of a gas-fired water heater.

The appealing features of the portable outdoor steamer system are its large size, convenience, and ease of use. The system provides a fast, efficient means of steaming vegetables, shellfish, and other foods on a mobile basis, thereby potentially increasing the offerings capable of being prepared at a barbecue. It features a large capacity and is strong, durable and resistant to corrosion.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A new and improved portable outdoor steamer system for steaming food with a portable outdoor system comprising, in combination:

a hollow cylindrical container with an open top and a closed generally inverted dome-shaped bottom with a cover in a dome-shaped configuration and with a hinge pivotally securing the cover to the top of the container and a handle extending from the upper center of the cover to radially exterior of the cover;

a hollow cylindrical support having a circular base at its lower end and with a circular upper end secured to the lower surface of the bottom of the container;

heating components including a propane burner secured in the upper extent of the support on a circular plate, a propane hook-up mounted externally on the base and operatively coupled to the burner, and an ignition button and a heat control dial mounted externally of the housing on a control panel operatively coupled to the burner with air holes through the base above the plate and a door formed in the housing to provide access to the burner; and air ports extending through the container in a central extent thereof with three perforated food supporting racks removably secured within the container on short radial fingers above the ports and a water tap in the lower extent of the container for the removal of water therefrom, the region of the container beneath the ports for retaining water to be heated and converted into steam for cooking food supported thereabove on the racks.

2. A portable outdoor steamer system comprising:

a hollow container having an open top and a closed bottom with a cover hingably mounted over the open top, wherein the container is adapted to hold water therein;

a hollow support with an upper end integrally coupled to the bottom of the container;

heating components including a burner secured in an upper end of the support on a plate and beneath the bottom of the container, a hook-up mounted externally on the support and operatively coupled to the burner, and a heat control dial mounted externally of the housing on a control panel and operatively coupled to the burner; and at least one food supporting rack removably secured within the container;

wherein the container is equipped with air ports extending through the container in a central extent thereof just below the at least one food supporting rack for venting steam generated from the water and further releasing excess water;

wherein air holes are formed in side walls of the support above the plate and below the container for venting heat from the burner.

3. The system as set forth in claim 2 wherein the air ports are spaced 90 degrees apart.

4. The system as set forth in claim 2 wherein the air holes are spaced 90 degrees apart.

5. The system as set forth in claim 2 and further including a pair of handles mounted on diametrically opposed points on the container.

6. The system as set forth in claim 2 wherein a handle is mounted on the cover.

\* \* \* \* \*